United States Patent
Chui (10) Patent No.: US 7,602,131 B1
(45) Date of Patent: *Oct. 13, 2009

(54) VOICE COIL MOTOR CONTROL SYSTEM AND METHOD USING PULSE WIDTH MODULATION

(75) Inventor: Siew Yong Chui, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/327,860

(22) Filed: Dec. 4, 2008

Related U.S. Application Data (63) Continuation of application No. 11/455,476, filed on Jun. 19, 2006, now Pat. No. 7,466,095.

(60) Provisional application No. 60/740,103, filed on Nov. 28, 2005.

(51) Int. Cl.
*H02P 7/00* (2006.01)
*H02P 3/08* (2006.01)

(52) U.S. Cl. .................. 318/400.34; 318/254; 318/268; 318/276; 360/73.03; 360/75

(58) Field of Classification Search ............ 318/400.34, 318/254, 268, 276; 360/73.03, 75
See application file for complete search history.

(56) References Cited

U.S. PATENT DOCUMENTS

| | | | |
|---|---|---|---|
| 5,965,992 A | | 10/1999 | Goretzki et al. |
| 6,232,758 B1 * | | 5/2001 | Konda et al. ................. 323/351 |
| 6,600,618 B2 * | | 7/2003 | Schlager ....................... 360/75 |
| 6,631,045 B1 * | | 10/2003 | Pedrazzini ................... 360/75 |
| 6,664,749 B2 | | 12/2003 | Heydt et al. |
| 6,697,207 B2 * | | 2/2004 | Harmer ........................ 360/75 |
| 6,700,344 B1 | | 3/2004 | Krishnamoorthy et al. |
| 6,765,746 B2 | | 7/2004 | Kusumoto |
| 7,012,391 B2 | | 3/2006 | DuLaney |
| 7,062,160 B2 | | 6/2006 | Heydt et al. |
| 7,079,350 B1 * | | 7/2006 | Vertemara et al. ......... 360/78.06 |
| 7,106,546 B2 * | | 9/2006 | Galbiati ....................... 360/75 |
| 7,145,743 B2 * | | 12/2006 | Park et al. ..................... 360/75 |
| 7,333,286 B2 | | 2/2008 | Jung et al. |
| 7,369,346 B2 | | 5/2008 | Yamamoto |
| 7,432,677 B2 | | 10/2008 | Heydt et al. |
| 2002/0071199 A1 * | | 6/2002 | Kokami et al. ........... 360/77.02 |
| 2002/0141098 A1 * | | 10/2002 | Schlager ...................... 360/75 |
| 2002/0196575 A1 * | | 12/2002 | Harmer ....................... 360/75 |
| 2004/0036436 A1 | | 2/2004 | Tieu |
| 2004/0245950 A1 | | 12/2004 | Ang et al. |
| 2005/0117245 A1 * | | 6/2005 | Park et al. ..................... 360/75 |
| 2005/0157418 A1 * | | 7/2005 | Galbiati ....................... 360/75 |
| 2007/0230027 A1 | | 10/2007 | Kawabe |

OTHER PUBLICATIONS

USPTO Non-Final Office Action mailed Apr. 2, 2008 for U.S. Appl. No. 11/455,476, filed Jun. 19, 2006.

Amendment filed Jul. 1, 2008 in response to USPTO Non-Final Office Action mailed Apr. 2, 2008 for U.S. Appl. No. 11/455,476, filed Jun. 19, 2006.

* cited by examiner

*Primary Examiner*—Paul Ip (57) ABSTRACT

A system includes a current control module that supplies current to a voice coil motor during a first period to rotate an actuator arm in a first rotational direction, that discharges the current from the voice coil motor after the first period, and that generates a control signal a predetermined period after the current is discharged. A back electromagnetic force (bemf) module generates a bemf signal in response to the control signal. A speed control module determines a speed of the actuator arm based on the bemf signal.

16 Claims, 10 Drawing Sheets

VOICE COIL MOTOR CONTROL SYSTEM AND METHOD USING PULSE WIDTH MODULATION

CROSS-REFERENCE TO RELATED APPLICATIONS

This application is a continuation of U.S. patent application Ser. No. 11/455,476, filed Jun. 19, 2006, which claims the benefit of U.S. Provisional Application No. 60/740,103, filed Nov. 28, 2005. The disclosure of the above application is incorporated herein by reference in its entirety.

FIELD

The present disclosure relates to hard disk drives, and more particularly, to systems and methods for controlling a speed of an actuator arm having a read write element thereon.

BACKGROUND

Electronic devices such as computers, laptops, personal video recorders (PVRs), MP3 players, game consoles, set-top boxes, digital cameras, and other electronic devices often need to store a large amount of data. Storage devices such as hard disk drives may be used to meet these storage requirements. The cost of data storage often has a significant impact on the overall cost of the device. Therefore, reducing the cost of data storage can dramatically impact the overall cost of these devices.

Figure 1:
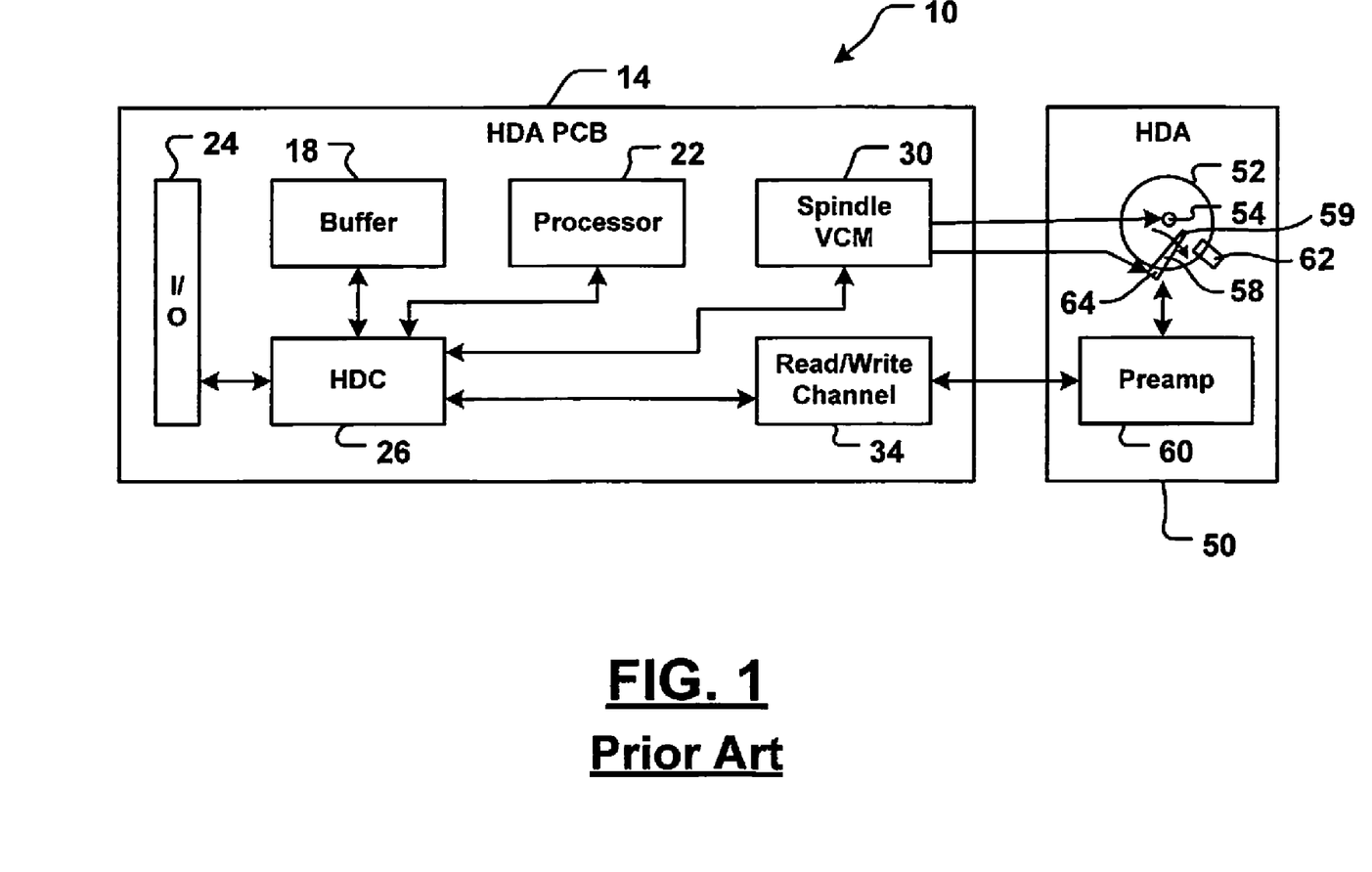
FIG. 1 is a functional block diagram of a hard disk drive according to the prior art.

Referring now to FIG. 1, data storage architecture 10 typically includes a hard drive assembly (HDA) printed circuit board (PCB) 14 and a buffer 18 arranged thereon that stores data that is associated with the control of a hard disk drive. The buffer 18 may employ SDRAM or other types of low latency memory. A processor 22 arranged on the HDA PCB 14 performs processing that is related to the operation of the hard disk drive. A hard disk controller (HDC) 26 communicates with an input/output interface 24 and with a spindle/voice coil motor (VCM) driver 30 and/or a read/write channel 34.

During write operation read/write channel 34 essentially encodes the data to be written onto a read/write device 59, as described in detail herein below. The read/write channel 34 processes the signal for reliability and may include, for example, error correction coding (ECC), run length limited coding (RLL), and the like. During read operations, the read/write channel 34 converts an analog output of the read/write device 59 to a digital signal. The converted signal is then detected and decoded by known techniques to recover the data written on the hard disk drive.

As can be appreciated, one or more of the functional blocks of the HDA PCB 14 may be implemented by a single integrated circuit (IC) or chip. For example, the processor 22 and the HDC 26 may be implemented by a single chip. The spindle/VCM driver 30 and/or the read/write channel 34 may also be implemented by the same chip as the processor 22 and/or the HDC 26.

A hard drive assembly (HDA) 50 includes one or more hard drive platters 52 that include a magnetic coating that stores magnetic fields. The platters 52 are rotated by a spindle motor that is schematically shown at 54. Generally the spindle motor 54 rotates the hard drive platter 52 at a fixed speed during the read/write operations. One or more read/write actuator arms 58 moves relative to the platters 52 to read and/or write data to/from the hard drive platters 52. The spindle/voice control motor (VCM) driver 30 controls the spindle motor 54, which rotates the platter 52. The spindle/VCM driver 30 also generates control signals that position the read/write actuator arm 58, for example using a voice coil motor. Voice coil motors control the movement of a coil toward or away from a permanent magnet based upon the amount of current flowing through it.

A read/write device 59 is located near a distal end of the read/write actuator arm 58. The read/write device 59 includes a write element such as an inductor (commonly referred to as a head) that generates a magnetic field. The read/write device 59 also includes a read element (such as a magneto-resistive (MR) element) that senses the magnetic field on the platter 52. The HDA 50 includes a preamp circuit 60, which amplifies analog read/write signals. When reading data, preamp circuit 60 amplifies low level signals from the read element and outputs the amplified signal to the read/write channel device. While writing data, a write current is generated which flows through the write element of the read/write device 59. The current is switched to produce a magnetic field having a positive or negative polarity. The positive or negative polarity is stored by the hard drive platter 52 and is used to represent data.

During operation the read/write device 50 flies over the surface of the disk platters. A cushion of air supports the read/write device 59 when rotating. On older hard disk drives, when the platters 52 are not moving, the cushion of air dissipates and the heads float down and contact the surface of the platters 52. Because this was a potential source of damage, a ramp 62 is used to receive the read/write device 52 as the read/write or actuator arm 58 rotates about an axis 64. When the spindle motor is stopped, the heads are completely lifted off the surface of the disk and engage the ramp 62. After the read/write device 59 engages the ramp 62, the disk is allowed to spin down. When the power is reapplied to the spindle 54, the process is reversed and the disk spins up. Once the disks are traveling fast enough to let the read/write devices 59 fly above the surface of the platters 52, the heads are moved off the ramp 62 and fly over the surface of the platters 52.

Controlling the speed of the VCM is desirable to prevent the read/write device 59 from touching a surface of the platter 52 during ramp loading and unloading. Thus, knowing the velocity of the actuator arm 58 is important. The velocity of the VCM is directly proportional to back electromagnetic force (bemf) voltage $V_{bemf}$ generated by the motor. The voltage drop across the motor is related to the motor resistance, motor inductance, and the bemf. All voltage components act in series. For a current $I_m$ flowing through the motor, the voltage across the motor terminal $V_m$ is defined as:

$$V_{in}=I_m*R_m+L_m*dI_m/dt+V_{bemf}$$

For extraction of $V_{bemf}$, the voltage due to motor resistance and inductance should be canceled. In a linear mode, a constant current may be applied to let $L_m*dI_m/dt=0$. The resistance component may be cancelled by introducing an $I_m*R_s*$Gain term. $R_s$ is the current sense resistor and the gain term is calibrated to $R_m/R_s$. Therefore, $V_{bemf}$ may be found by:

$$V_{in}=I_m*R_m+L_m*dI_m/dt+V_{bemf}-I_m*R_s*\text{Gain}$$

$$V_{in}=V_{bemf} \text{ when Gain}=R_m/R_s \text{ and } I_m \text{ is constant}$$

However, when the VCM is PWM (pulse width modulation) driven, the current is switching which generates a ringing or transients in the signal. Before measuring the back emf, the transients must be allowed to subside.

SUMMARY

One feature of the disclosure includes a control module that communicates with a plurality of switching devices to generate current through a voice coil motor during a first time period so that an actuator arm rotates in a first rotational direction in response to the current. The control module controls the switching devices to discharge the current from the voice coil motor during a second time period less than the first time period so that the first rotational direction of the actuator arm is maintained after discharging the current. The control module further includes a back electromagnetic force (bemf) module for determining a bemf voltage after controlling the switching devices to discharge the current, and an actuator arm speed control module for determining an actuator arm speed in response to the bemf voltage.

Yet another feature of the disclosure includes a method of operating an actuator. The method includes generating a current through a voice coil motor in a first direction for a first time, rotating the actuator in a first rotational direction in response to the current, discharging the current from the voice coil motor and charging an energy storage device for a second time less than the first time, maintaining first rotational direction of the actuator after discharging the current, and determining an actuator speed after discharging the current.

In other features, control means for communicating with a plurality of switching means to generate current through a voice coil motor during a first time period so that an actuator arm rotates in a first rotational direction in response to the current and that controls the switching means to discharge the current from the voice coil motor during a second time period less than the first time period so that the first rotational direction of the actuator arm is maintained after discharging the current. Back electromotive force (bemf) means determines a bemf voltage after controlling the switching devices to discharge the current. Actuator means determines an actuator arm speed in response to the bemf voltage.

In other features, energy storage means stores energy. The control means controls the switching means so that the current is drawn from the energy storage means. The energy storage means may include capacitance means for providing capacitance. The control means may also control the switching means so that discharging the current charges the energy storage device.

In other features, the switching means may include a first switching means for switching and second switching means for switching in communication with a first side of the voice coil motor and third switching means for switching and fourth means for switching in communication with a second side of the motor. The first switching means and the third switching means are in communication with the energy storage means and the second switching means and the third switching means are in communication with a reference voltage.

In other features, the control means controls the first switching means and the fourth switching means to a conducting state and the second switching means and fourth switching means to a non-conducting state during the first time period. The control means controls the first switching means and the fourth switching means to a non-conducting state and the second switching means and fourth switching means to a conducting state during the second time period.

In yet other features, the control means may couple the first side to the energy storage means and the second side to a reference voltage during the first time period. The control mean controls the first side to ground and the second side to the energy storage means during the second time. Resistance means for providing resistance may communicate with the first side and second side.

In other features, raw bemf means for communicating with the first side and the second side generates a raw bemf voltage signal. Sampling means samples the raw bemf signal to generate a sampled bemf voltage signal. Decoder means converts the sampled bemf voltage signal into a digital speed signal.

In other features, adjustment means adjusts a sampling interval of the control module in response to a time constant. The time constant may be based on motor inductance and motor resistance.

Another feature is that the system may be implemented in a hard disk drive.

In other features, the system may also include converter means for converting the bemf voltage signal into a digital voltage signal and decoder means for converting the digital voltage signal into a speed signal. Pulse width generator means generates a pulse width modulated motor control signal in response to the speed signal may used. Time constant adjustment means in communication with the pulse width generator means adjusts the pulse width motor control signal.

A computer program executed by a processor for operating an actuator includes generating a current through a voice coil motor in a first direction for a first time, rotating the actuator in a first rotational direction in response to the current, discharging the current from the voice coil motor and charging an energy storage device for a second time less than the first time, maintaining first rotational direction of the actuator after discharging the current, and determining an actuator speed after discharging the current from the time less than the first time so that the first direction of the actuator is maintained.

In other features, the computer program generates a current from the energy storage device. The energy storage device may be a capacitor.

In other features, the computer program determines the current as a function of an inductance of the voice coil motor, a resistance of the voice coil motor and a voltage of the energy storage device. The computer program waits a settling time and determines a back electromagnetic force (bemf). The computer program determines the actuator speed in response to the back electromagnetic force. The computer program determines the first time as a function of an inductance of the voice coil motor and a resistance of the voice coil motor. The computer program controls the voice coil motor in response to the actuator speed. The computer program may, prior to determining an actuator speed, be used for waiting a settling time after discharging the current.

In other features, the computer program amplifies and level shifts the motor voltage to form a raw bemf signal. After amplifying and level shifting, the computer program samples the raw bemf signal and holds the raw bemf signal to form a bemf voltage signal. The computer program converts the bemf signal into a digital signal and the digital signal into the actuator speed. The computer program generates, rotates, discharges, maintains during a parking mode.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure provides systems and methods of pulse width modulating (PWM) the voice coil motor (VCM) that increase the energy efficiency of the system. Systems and methods of PWM driving the VCM to increase the maximum PWM drive frequency for back electromagnetic force (bemf) voltage detection are also disclosed. Advantageously, the detected VCM back emf voltage $V_{bemf}$ is determined independently from the motor resistance variation. A VCM velocity control system also does not require ($R_m/R_s$) calibration. A programmable clock frequency is also disclosed that onetime adjusts for a motor-inductance/motor-resistance ($L_m/R_m$) time constant.

Figure 2:
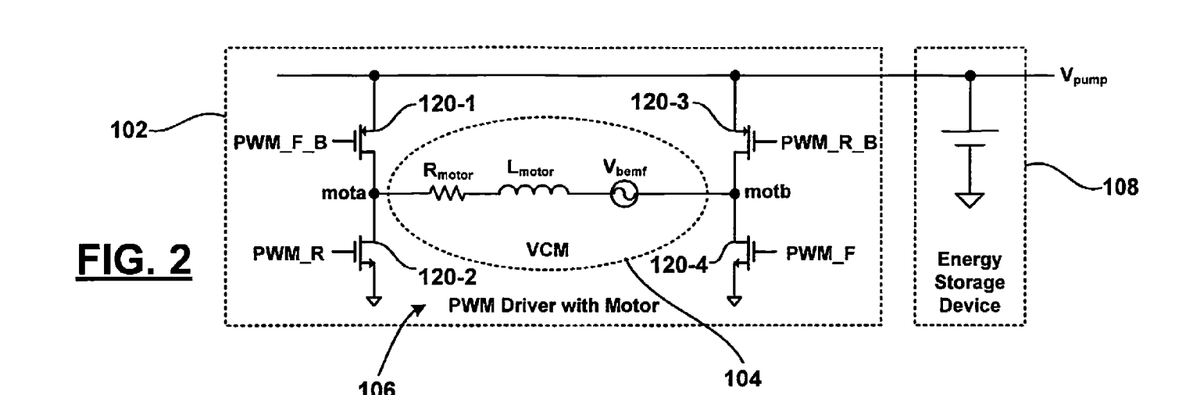
FIG. 2 is a functional block diagram and schematic of a pulse width modulated driver module for a motor.

Referring now to FIG. 2, a pulse width modulated driver (PWM) module 102 for a voice coil motor 104 is shown. The PWM driver module 102 includes a plurality of power amplifiers or switching devices 120-1 through 120-4 that have a control terminal that receives PWM signals from a control module (shown below in FIG. 6) to selectively turn on and off each amplifier to achieve the improved operating characteristics mentioned above. The driving signals include PWM forward (PWM_F) (and its inverse (PWM_F_B)) and PWM reverse PWM_R (and its inverse (PWM_R_B)). In FIG. 2, four power amplifiers are illustrated as transistors 120-1, 120-2, 120-3 and 120-4 (collectively transistors 120). The transistors may include but are not limited to various types of metal oxide semi-conductor devices such as DMOS, CMOS, MOSFET and various other types of field effect transistors. A second terminal of the transistor 120-1 and a first terminal 120-2 are connected to a first terminal or node mota of the VCM 104. A first terminal of the transistor 120-3 and a second terminal of transistor 120-4 are connected to a second terminal or node motb of the VCM 104. The transistors 120 form an H bridge with the VCM 104 between a pair of transistors on each side.

The VCM 104 is illustrated having an $R_{motor}$, an $L_{motor}$, and a voltage due to back electromagnetic force (Vbemf). As mentioned above, the voltage associated with the back electromagnetic force (bemf) may be used to determine the speed of the actuator arm under the conditions as described below.

A first terminal of transistors 120-1 and 120-3 are in communication with a node that corresponds to a voltage $V_{pump}$. Second terminals of transistors 120-2 and 120-4 are connected to a reference potential such as a common or ground.

An energy storage device 108 such as a capacitor is coupled between $V_{pump}$ and the reference potential. As will be described below, the size of the energy storage device 108 may be reduced because of the efficiencies of the present invention. This advantageously allows the circuit to be reduced in cost due to a smaller energy storage device and allows the area of the PC board to be reduced.

The energy stored in the energy storage device 108 is used to move the actuator arm for unloading of the read/write device because the main supply voltage may be cut off at any time. When the power is interrupted, movement of the read/write device must still be performed.

The PWM driver module 102 is used to drive the VCM 102 forward or backward depending on the desired direction of travel and desired speed of the actuator arm. The term forward drive cycle or driving forward is used to mean driving the actuator arm in the direction of the target velocity. The terms reverse drive cycle or reverse driving are used to mean slowing down of the motor or reversing direction of the motor when the target velocity is exceeded. When driving the motor in a forward direction, mota is pulled high to about $V_{pump}$ and motb is pulled to a reference potential such as ground.

All the voltages inherently are subject to junction losses at the switching devices. Thus, the current path is through transistor 120-1, through motor 104 and through transistor 120-4. Transistor 120-1 and transistor 120-4 are thus placed in the conducting or on state and transistors 120-2 and 120-3 are placed in the off or non-conducting state. In a reverse direction, node motb is pulled high to $V_{pump}$ and mota is pulled to ground. Thus, in the reverse direction, transistors 120-3 and 120-2 are in a conducting state while transistors 120-1 and 120-4 are in a non-conducting state. The current that flows through transistor 120-3, motor 104 and transistor 120-2 is in the same direction and is used to discharge the current in the motor 104. That is, the inductance $L_{motor}$ continues the current in the same direction. The inductor current is used to charge the energy storage device 108.

What has been described immediately above refers to moving the actuator arm in a forward direction. To move the actuator arm in a reverse direction or slow down the forward direction, motb is in communication with $V_{pump}$ and mota is pulled to ground. That is, transistor 120-3 and 120-2 are conducting while transistors 120-4 and 120-1 are non-conducting. Current is thus driven through the motor in the reverse direction from node motb to node mota. To quickly discharge the current through the motor caused by the inductance of the motor, the polarity of nodes mota and motb are reversed. Thus, node motb is in communication with ground through transistor 120-4 and node mota is in communication with $V_{pump}$ through transistor 120-1. Transistors 120-2 and 120-3 are thus non-conducting. The current is discharged to charge the energy storage device 108.

When driving backward, node motb is pulled to $V_{pump}$ for several purposes: to increase the energy efficiency of the system as inductor re-circulation current flows back to $V_{pump}$, to charge the energy storage device, and to reduce the discharge time for the motor inductor current to decay to zero.

With a higher energy efficiency system, a smaller $V_{pump}$ energy storage device 108 may be used to save cost and printed circuit board (PCB) space. A quicker decay allows the PWM switching frequency to be increased. With a higher PWM frequency, the velocity loop is faster and the audio noise moves further out of human hearing range.

After driving the actuator arm in a forward direction or a backward direction, a tristate period may be introduced to wait a predetermined time and sample the bemf voltage. Based upon the voltage of the bemf, the speed of the motor is determined. When the target speed is reached, the tristate cycle may be used to sample the motor bemf. A timing example is provided in FIG. 4 below.

Figure 3:
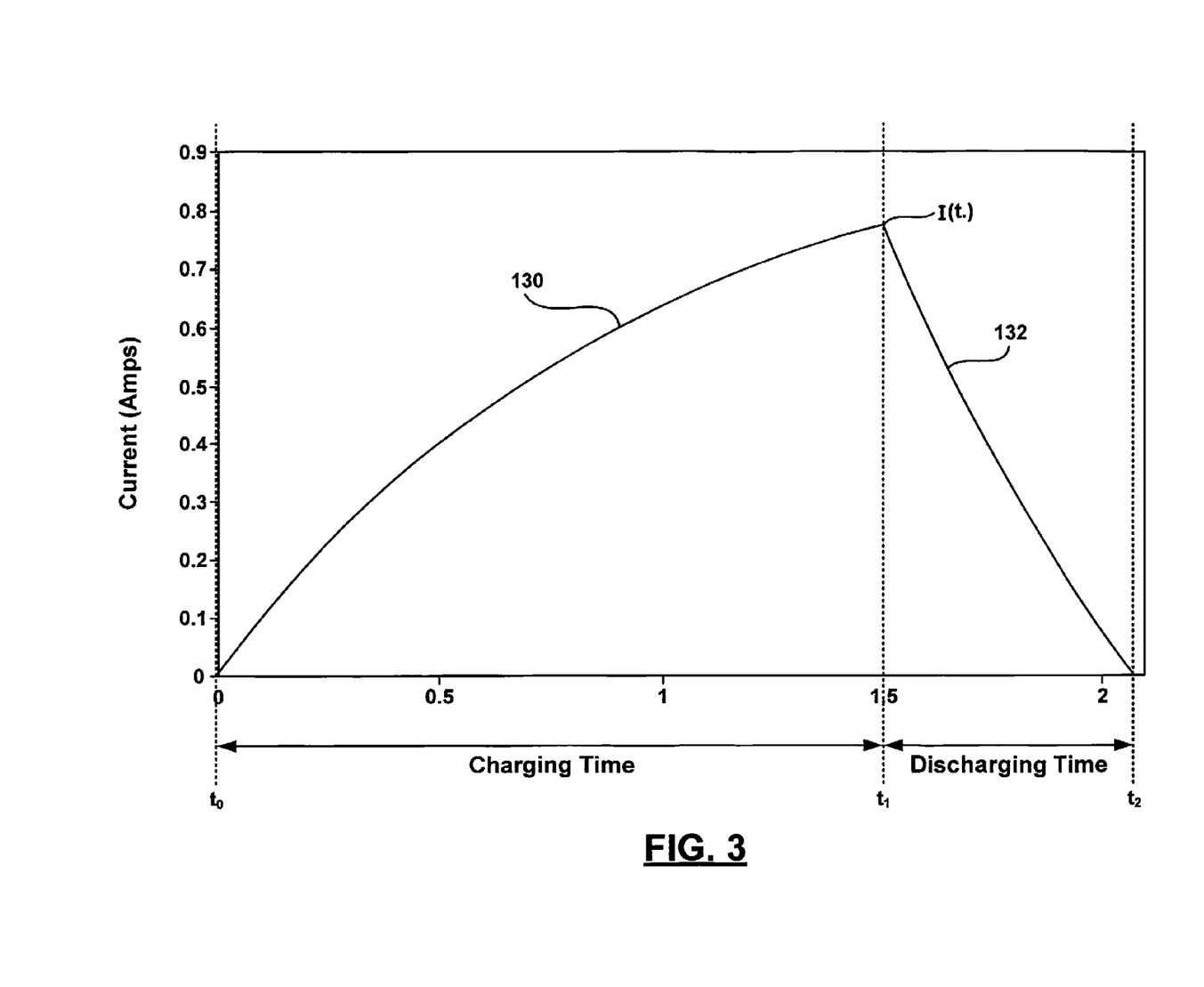
FIG. 3 is a graph showing charging and discharging time.

Referring now to FIG. 3, to determine the current and times associated with the driving or charging time period ($T_{on}$) and of the reverse cycle time period ($T_{off}$), the charging and discharge time periods of the motor current is determined. As will be described below, the timing may be converted into a digital count for the charge time, discharge time and settling time and store it into the control module memory. It should be noted that the same formulas apply equally to moving the actuator arm in either direction. The improved system of the present invention controls the transistors to allow the discharge time portion to be reduced in time rather than using a natural decay time as in prior known systems. Consequently, the goal is to drive the current to zero by time t2.

First the motor driving or charging current 130 is determined with the initial current=0 at time $t_0$:

$$I(t) = I_{SS}\left(1 - e^{\frac{-t}{\tau}}\right) \text{ where } \tau = \frac{L_m}{R_m}$$

$$I_{SS} = \frac{V_{pump} - V_{bemf}}{R_m} \approx \frac{V_{pump}}{R_m} \text{ as } V_{pump} \gg V_{bemf}$$

$$I_{(t)} = \frac{V_{pump}}{R_m}\left(1 - e^{\frac{-t}{\tau}}\right)$$

The initial current at current $t_1$ is ($I_{t1}$). The discharging current curve 132 between $t_1$ and $t_2$ follows the equation:

$$I_{(t)} = I_{(t1)}e^{\frac{-t}{\tau}} - I_{SS}\left(1 - e^{\frac{-t}{\tau}}\right)$$

$$I_{(t2)} = \frac{V_{pump}}{R_m}\left(1 - e^{\frac{-t1}{\tau}}\right)e^{\frac{-t2}{\tau}} - \left(1 - e^{\frac{-t2}{\tau}}\right)$$

To calculate time $t_2$ needed to discharge motor current with respect to charging time $t_1$ the following holds:

$$I_{(t2)} = 0$$

$$0 = \left(1 - e^{\frac{-t1}{\tau}}\right)e^{\frac{-t2}{\tau}} - \left(1 - e^{\frac{-t2}{\tau}}\right)$$

$$\left(1 - e^{\frac{-t1}{\tau}}\right)e^{\frac{-t2}{\tau}} = \left(1 - e^{\frac{-t2}{\tau}}\right)$$

$$t2 = \tau\left(\ln\left(2 - e^{\frac{-t1}{\tau}}\right)\right)$$

Figure 4:
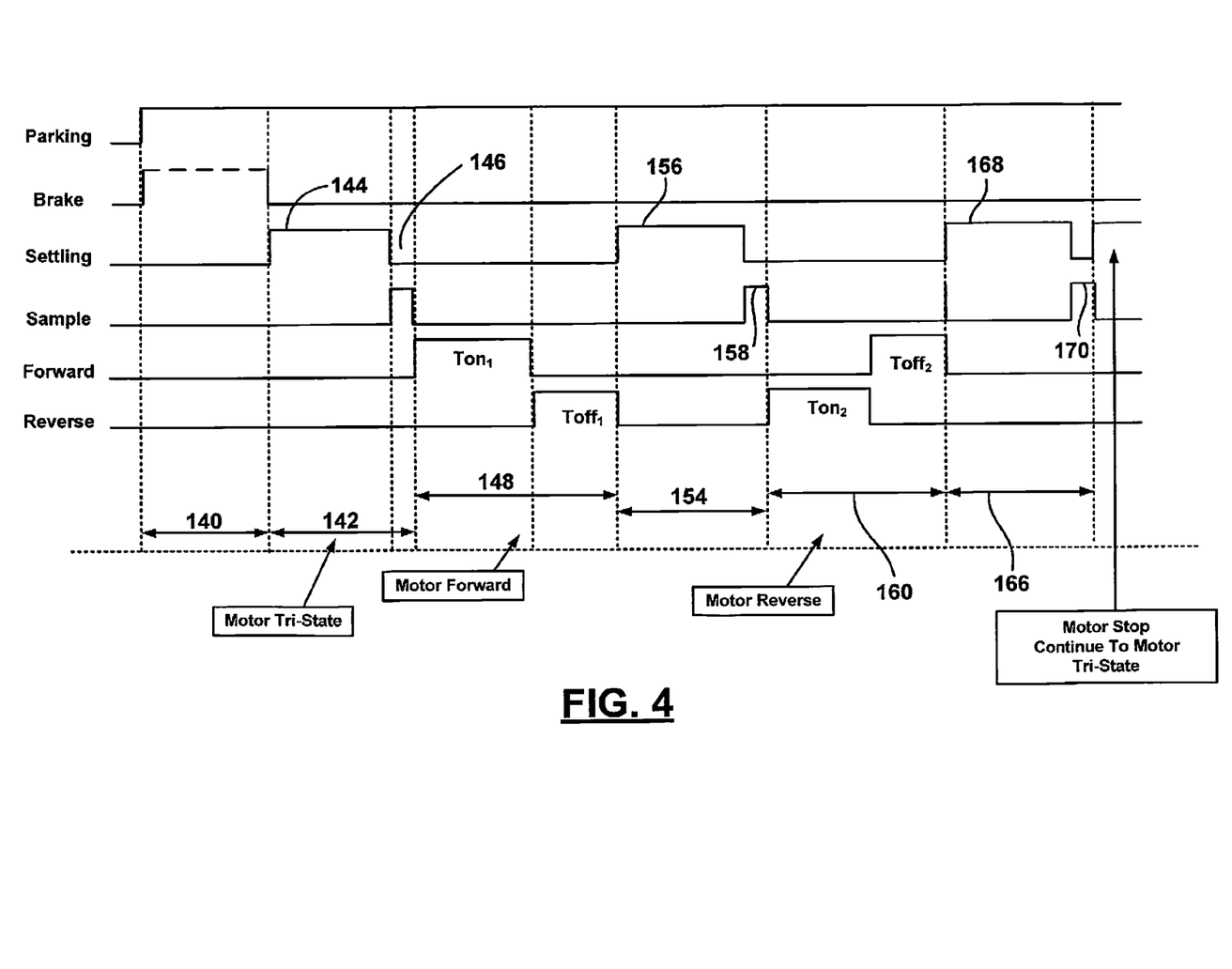
FIG. 4 is a timing diagram for the PWM driver module.

Referring now to FIG. 4, the operation of the forward, reverse, sample, settling, break and parking times is illustrated. The present invention is used during a parking condition and thus the parking signal is one as illustrated. The present invention may also be performed prior to a braking event. The braking event is optional and is therefore dotted as illustrated in time period 140.

The next time period is referred to as a tri-state cycle 142. During the tri-state cycle 142, a settling time 144 is performed. The settling time 144 allows the motor current to settle to zero before the sampling time 146 is performed. During the sampling time 146, as will be described below, the voltage due to the back emf is sampled. From the voltage due to the back emf the motor speed is determined.

In the present example, the speed of the actuator arm determined during the sample period indicates the actuator arm is to be increased in velocity. Thus, a forward drive cycle 148 is performed. The forward drive cycle 148 has an on period $T_{on1}$ and an off period $T_{off1}$. During $T_{on1}$ the node mota is driven to high and node motb is driven to ground. During $T_{off1}$, motb is driven high and node mota is driven low. The $T_{off1}$ period allows the current through the motor to be rapidly discharged and the energy storage device 108 to be charged by the current. A second tri-state cycle is performed immediately off at the $T_{off1}$ period during time 154.

During the tri-state cycle time 154, the second sample time 158 determines that a reverse drive cycle is needed to slow down the speed of the actuator arm. The motor is thus driven in reverse during reverse drive cycle 160. During the reverse drive period $T_{on2}$, the switches are controlled so that node motb is driven high and node mota is driven low. Current through the motor as illustrated in FIG. 2 is thus to the left. The off period $T_{off2}$ has a shorter duration than the on cycle $T_{on2}$. $T_{off2}$ has node mota driven high and node motb driven low. This allows the current to discharge from the motor and charge the energy storage device 108 illustrated in FIG. 1.

In FIG. 4 it should be noted that the charging currents during the $T_{on1}$ and $T_{on2}$ periods are determined with respect to timing cycle $t_0$ shown in FIG. 3. $T_{off1}$ and $T_{off2}$ are determined as the discharging time from $t_1$ to $t_2$ of FIG. 3. It should be noted that in both cases the off portion of the forward or reverse drive cycles are smaller than the on cycle. The off cycle allows the current in the motor to be discharged before the end of the settling time of the following tri-state cycle. After the reverse drive cycle 160, a third tri-state cycle 166 is illustrated. The tri-state cycle 166 has another settling time 168 and another sampling time 170. Depending on the desired speed of the motor, a reverse drive cycle or a forward drive cycle may be performed. If no change in velocity is performed another tri-state cycle may also be performed immediately after a previous tri-state cycle.

Figure 5:
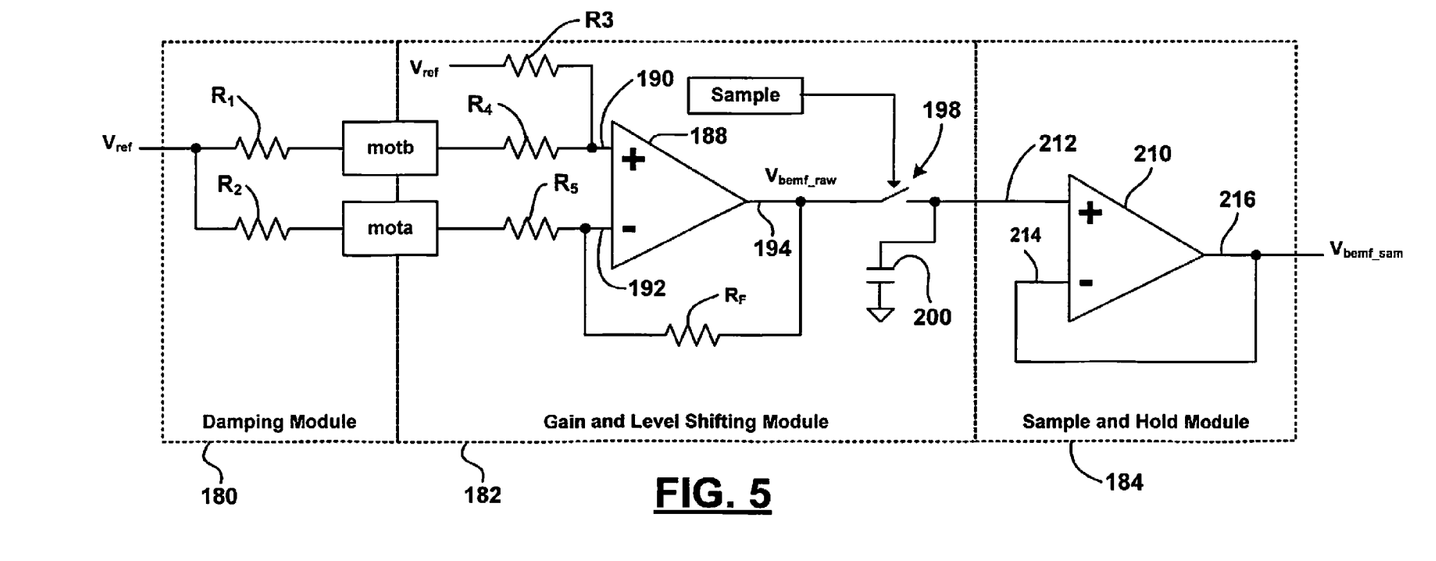
FIG. 5 is a functional block diagram of a damping module, a gain and level shifting module and a sample and hold module.

Referring now to FIG. 5, a circuit for obtaining a back emf voltage sample ($V_{bemf\_sam}$) is set forth. In this embodiment, a damping module 180 is in communication with a gain and level-shifting module 182. The gain and level-shifting module 182 is in communication with a sample and hold module 184. The damping module 180 is used to reduce the duration of ringing after the $T_{off}$ cycles illustrated in FIG. 4. Nodes motb and mota are illustrated and correspond to the different sides or terminals illustrated in FIG. 2. An amplifier 188 is illustrated having a non-inverting input 190 and an inverting input 192. Amplifier 188 has an output 194. The non-inverting input 190 is in communication with a reference voltage $V_{ref}$ through a resistor R3. The non-inverting input 190 is also in communication with motb through resistor R4. The inverting input 192 is in communication with node mota through resistor R5. The inverting input is in communication with the output 194 through a feedback resistor $R_F$. The output of the amplifier 194 is a raw voltage corresponding to the back emf.

This signal is illustrated as $V_{bemf\_raw}$. A sample input 196 from a control module is used to open and close a switch 198 in communication with the output of output 194 of the amplifier 188. Switch 198 may be implemented in a variety of devices including an actual switch or in various types of transistors. A capacitor 200 provides filtering for the switching transients generated by the switch 198.

In general, the gain and level-shifting block 182 is used to amplify the $V_{bemf\_raw}$ signal from the motor. As the input signals for nodes mota and motb are pulse width modulated, the sample that holds the signal is used to obtain the proper bemf.

The sample and hold module 184 includes an amplifier 210 such as an operational amplifier. The amplifier 210 has a non-inverting input 212 in communication with the output of the switch 198. The amplifier 210 also has an inverting input 214 in communication with an output 216. The output 216 corresponds to the voltage $V_{bemf\_sam}$, which is an analog signal.

Figure 6:
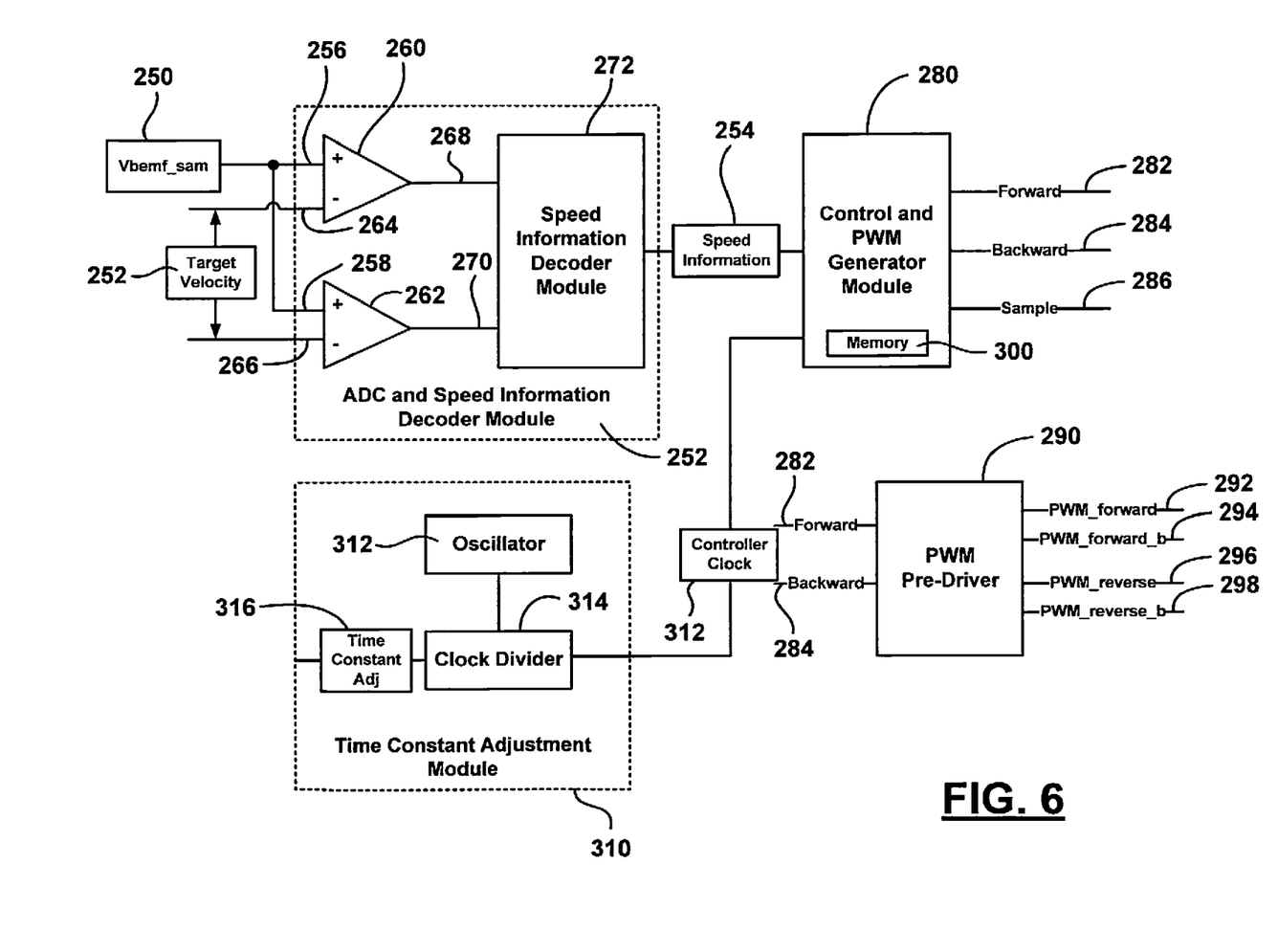
FIG. 6 is a functional block diagram of a voice coil motor PWM velocity control module.

Referring now to FIG. 6, the analog signal on the sample and hold module 184 of FIG. 5 is converted and adjusted in FIG. 6. The sampled bemf signal is provided in box 250 to an analog to digital and speed information decoder module 252. The target velocity 252 is another input to the analog to digital and speed information decoder module 252. The output of the module 252 is speed information 254.

The sampled back emf signal ($V_{bemf\_sam}$) 250 is provided to non-inverting input 256, 258 of respective amplifiers 260 and 262. The target velocity 252 is provided to respective inverting inputs 264 and 266 of amplifiers 260 and 262. The respective outputs 268 and 270 of amplifiers 260 and 262 are provided to a speed and information decoder module 272. The speed and information decoder module 272 provides speed information 254 with respect to the speed of the actuator arm. By comparing the speed derived from the $V_{bemf\_sam}$ signal with the target velocity signal an increase or decrease in speed is determined.

The speed information 254 is in communication with a control and pulse width modulation generator module 280. The control may be a digital controller. Thus, the output signals of the module 280 are a forward signal 282, a backward signal 284 and a sample signal 286. The forward signal 282 and the backward signal 284 are in communication with a pulse width modulator pre-driver 290 that is used to generate the signals for controlling the transistors of FIG. 2. As illustrated, a PWM_forward signal 292, a PWM_forward_B signal 294 are outputs in communication with transistors 120-1 and 120-2 respectively. The signal 294 is an inverse of signal 292. The other outputs of PWM driver 290 are a PWM_reverse signal 296 and a PWM_reverse_B signal 298. Again, the signal 298 is an inverse of signal 296.

Thus, the pulse width modulation pre-driver 290 provides the signals to provide the timing illustrated in FIG. 4.

It should also be noted that the control and pulse width modulation generator module 280 may have a memory 300 for storing the charge period, discharge periods and other desirable information corresponding to the operation of the hard drive.

The pulse width modulation frequency is limited by how fast the motor may be discharged. This is constrained by the electrical time constant of the motor which is defined as the motor inductance divided by the motor resistance ($L_m/R_m$) as set forth in the above calculations. The driving period for different motors may change from different manufacturers. A time constant adjustment module 310 provides a controller clock input 312 to the control and pulse width modulation generated module. The time constant adjustment module 310 includes an operator 312 and a clock divider 314. A time constant adjustment 316 may be performed by adjusting the clock speed divider one time depending on the characteristics of the motor.

Figures 7, 8:
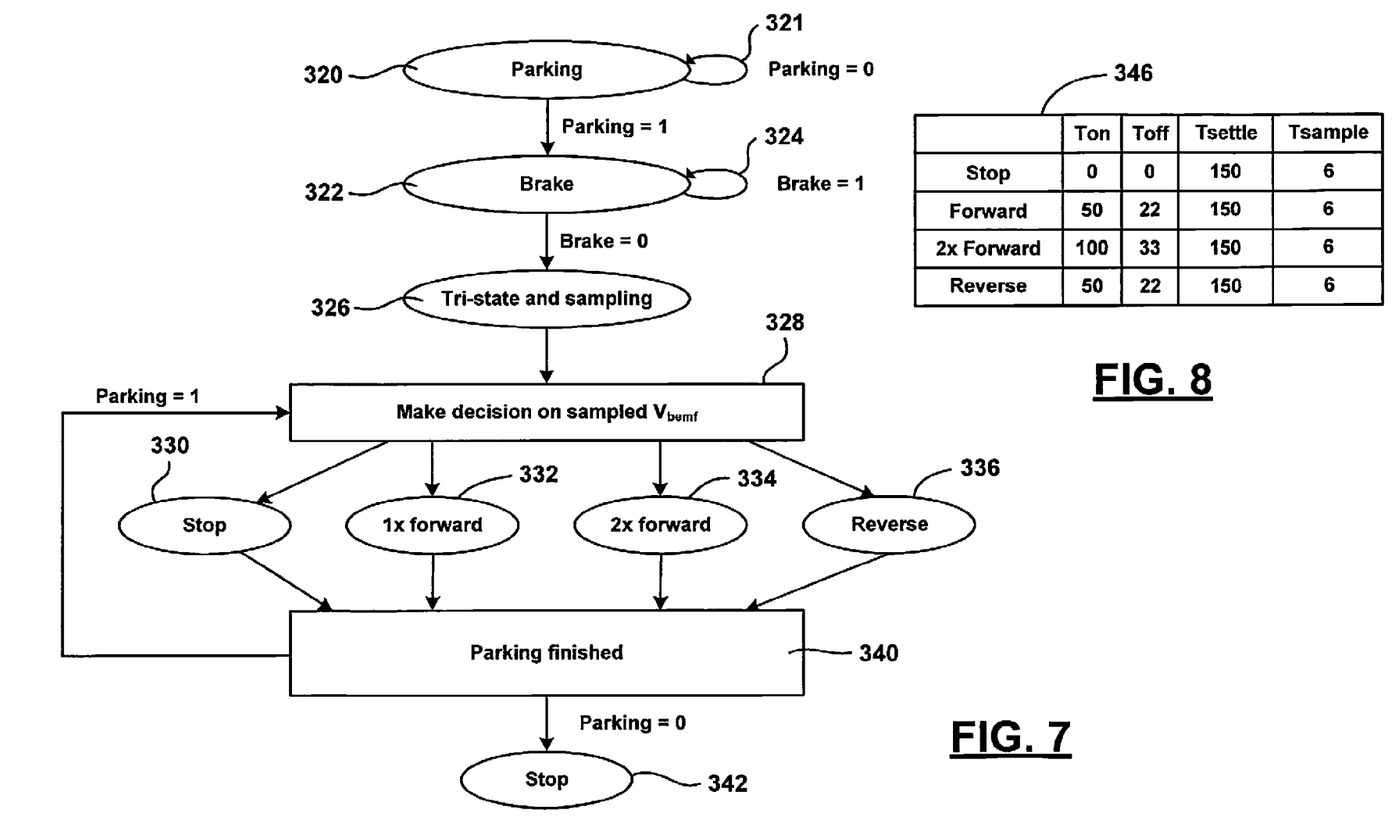
FIG. 7 is a state diagram for velocity control.
FIG. 8 is a sample timing chart.

Referring now to FIG. 7, a simplified state diagram for operating the present invention is illustrated. In step 320 the parking mode of the motor is determined. If the parking mode is zero illustrated by arrow 321, step 320 is again executed. If the parking mode is one in block 320, step 322 is performed. In block 322, if the brake signal is one corresponding to a braking mode illustrated by arrow 324, step 322 is again performed. If the braking mode is over in step 322, a tri-state and sampling mode is performed in block 326. The settling time and sample of the voltage of the bemf are performed during this step.

After the tri-state and sampling block 326, a decision is made based upon the sampled voltage of the back emf ($V_{bemf}$) in block 328. In block 328 four decisions are made in the present example. However, those skilled in the art will recognize that various other types of movements using different speeds may be performed. After step 328 the four examples set forth are: stopping the motor in step 330, moving the motor forward in a normal mode in step 332, a twice-as-fast mode (2×) in step 334 or reverse mode in block 336. Block 336 may also be performed to move the actuator arm in a reverse direction or slowing the velocity of the actuator arm down. After blocks 330 through 336, it is determined whether or not the parking mode is finished. If the parking mode is not finished (state=1) in block 340, block 328 is again executed and the speed of the actuator arm is adjusted. In block 340 if the parking mode is finished, block 342 stops the process.

It should be noted that before the process begins an optional braking period illustrated in block 322 may be performed. This will allow a sample to be obtained at the beginning of the cycle.

Referring now to FIG. 8, a table 346 is illustrated and includes a $T_{on}$ time, a $T_{off}$ time, a Tsettling time, and a Tsample time for each of the blocks 330 through 336 of FIG. 7. In the first row, a stop signal is illustrated in which the $T_{on}$ and $T_{off}$ cycles are zero while the Tsettle and Tsample counts are 150 and 6 respectively. It should be noted that the counts refer to a digital count which in turn corresponds to the length of time of the signal. During "Stop", non zero values of Ton and Toff can also be entered. In prior known voice coil motor controls, the settling time would be a lot larger due to the lack of the $T_{off}$ portion of the cycle.

The second row of table 346 corresponds to a forward driving of the actuator arm. The $T_{on}$ time is 50 counts while the $T_{off}$ time is 22 counts. Thereafter, the settling and sample times are the same as in the stop mode. In a two times forward mode, the $T_{on}$ cycle is 100 and the $T_{off}$ cycle is 33 while the Tsettle counts are 150 and the Tsample count is 6. In a reverse mode the $T_{on}$ time is 50 and the $T_{off}$ time count is 22 while the settling and sample counts correspond to 150 and 6, respectively. In the forward direction the node mota is pulled high and the node motb is pulled low and is longer than the time that node motb is pulled high and node mota is pulled low. This allows the actuator arm to maintain or increase its velocity in the desired direction. In the reverse mode, the $T_{on}$ time corresponds to node motb pulled high and node mota pulled low and is longer than the time that node mota is pulled high and node motb is pulled low during the $T_{off}$ portion of the cycle.

Figure 9A:
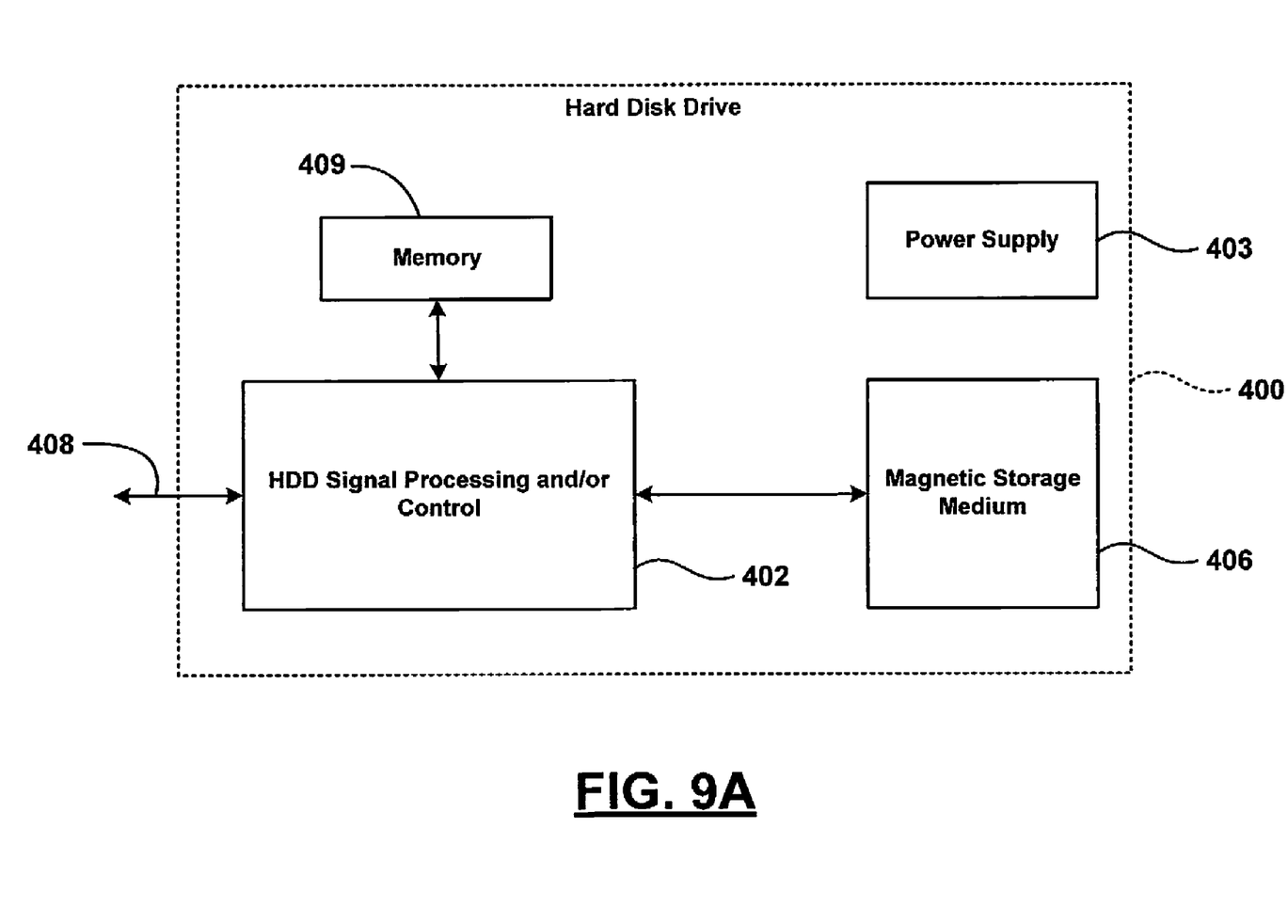
FIG. 9A is a functional block diagram of a hard disk drive.

Referring now to FIGS. 9A-9F, various exemplary implementations of the device are shown. Referring now to FIG. 9A, the device may be implemented in a controller of a hard disk drive 400. The device may implement and/or be implemented in either or both signal processing and/or control circuits and/or a power supply 403, which are generally identified in FIG. 9A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 9B:
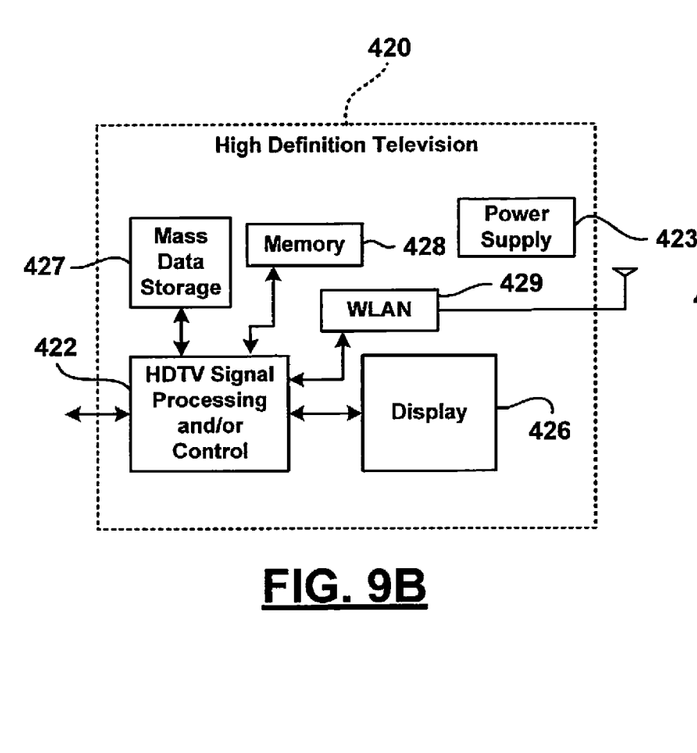
FIG. 9B is a functional block diagram of a high definition television.

Referring now to FIG. 9B, the device can be implemented in a mass data storage device 427 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 9C:
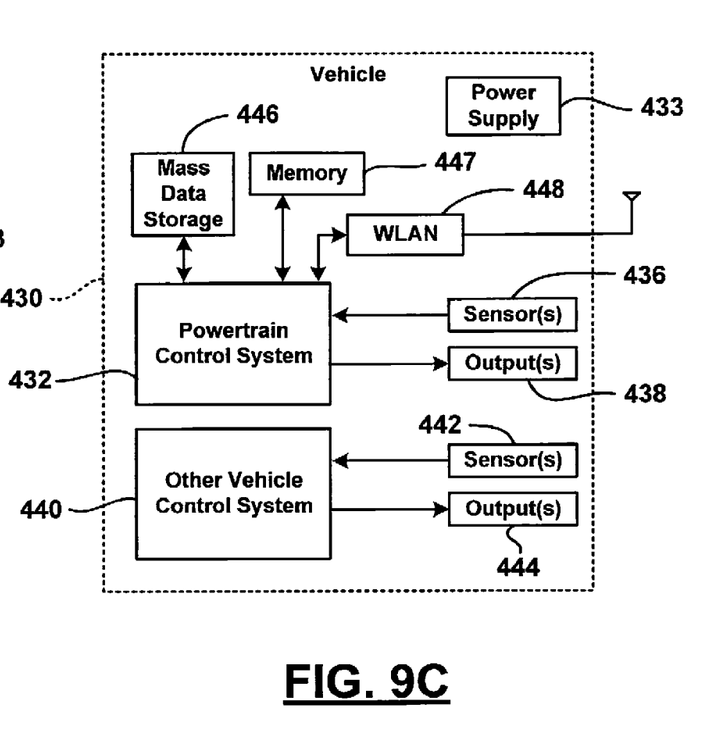
FIG. 9C is a functional block diagram of a vehicle control system.

Referring now to FIG. 9C, the device may implement and/or be implemented in mass data storage of a control system of a vehicle 430. In some implementations, the device may be implemented in a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The control system 440 may likewise receive signals from input sensors 442 and/or output control signals to one or more output devices 444. In some implementations, the control system 440 may be part of an anti-lock braking system (ABS), a navigation system, a vehicle telematics system, a lane departure system, an adaptive cruise control system, a vehicle entertainment system such as a stereo or video system, and the like. Still other implementations are contemplated.

The powertrain control system 432 may communicate with mass data storage 446 that stores data in a nonvolatile manner. The mass data storage 446 may include magnetic storage devices for example hard disk drives HDD. At least one HDD may have the configuration shown in FIG. 9A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9D:
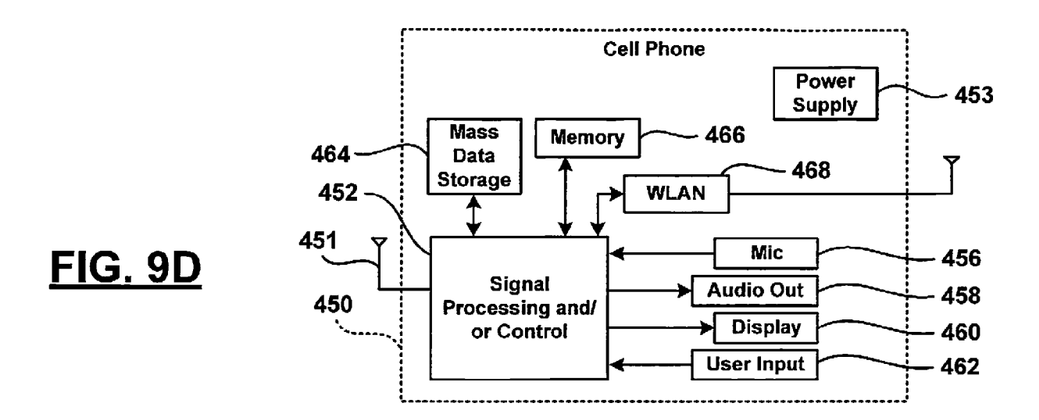
FIG. 9D is a functional block diagram of a cellular phone.

Referring now to FIG. 9D, the device can be implemented in mass data storage of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices, for example, a hard disk drive HDD. At least one HDD may have the configuration shown in FIG. 9A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9E:
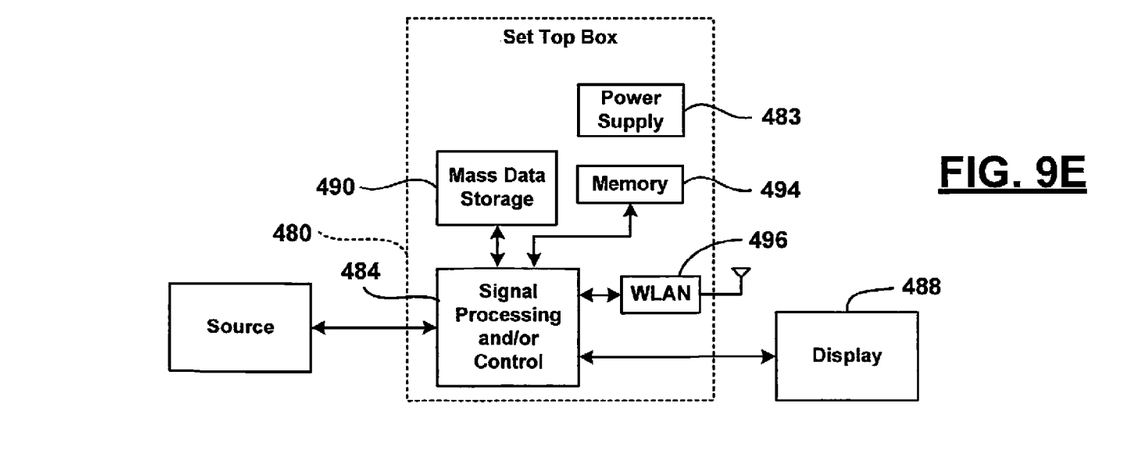
FIG. 9E is a functional block diagram of a set top box.

Referring now to FIG. 9E, the device can be implemented in mass data storage of a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDDs. At least one HDD may have the configuration shown in FIG. 9A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9F:
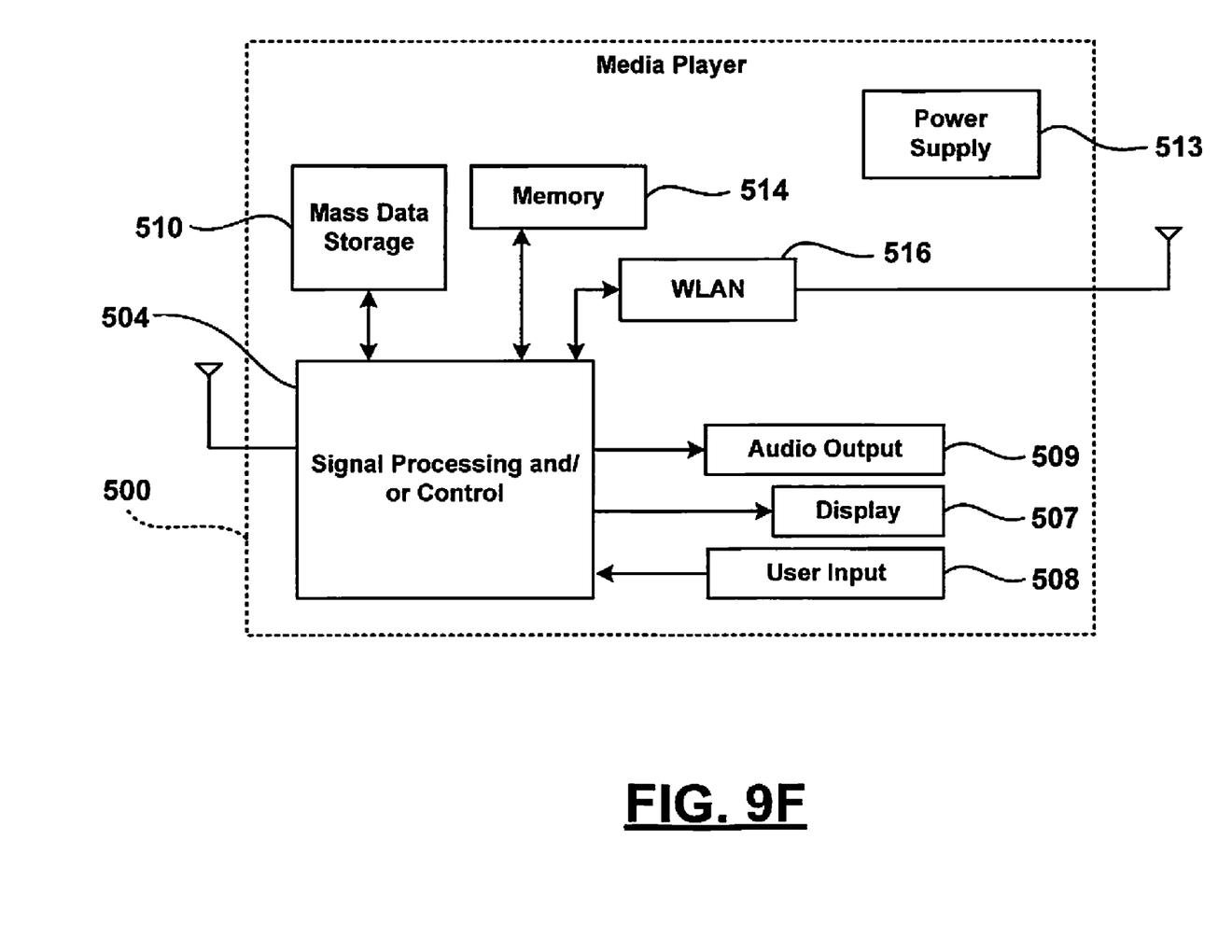
FIG. 9F is a functional block diagram of a media player.

Referring now to FIG. 9F, the device can be implemented in mass data storage of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDDs. At least one HDD may have the configuration shown in FIG. 9A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
a current control module that supplies current to a voice coil motor during a first period to rotate an actuator arm in a first rotational direction, that discharges the current from the voice coil motor after the first period, and that generates a control signal a predetermined period after the current is discharged;
a back electromagnetic force (bemf) module for generating a bemf signal in response to the control signal; and
a speed control module for determining a speed of the actuator arm based on the bemf signal.

2. The system of claim 1 further comprising:
a plurality of switches,
wherein the current control module controls states of the plurality of switches to control the current.

3. The system of claim 2 further comprising:
the voice coil motor; and
the actuator arm.

4. The system of claim 2, wherein the plurality of switches are arranged in an H bridge.

5. The system of claim 2 further comprising:
an energy storage device,
wherein the current control module controls the states of the plurality of switches to draw current from the energy storage device to supply the current to the voice coil motor.

6. The system of claim 5, wherein the energy storage device comprises a capacitor.

7. The system of claim 2 further comprising:
an energy storage device,
wherein the current control module controls the states of the plurality of switches to charge the energy storage device and discharge the current from the voice coil motor.

8. The system of claim 2 further comprising:
an energy storage device,
wherein the plurality of switches comprise:
a first switch and a second switch that communicate with a first terminal of the voice coil motor; and
a third switch and a fourth switch that communicate with a second terminal of the motor,
wherein the first switch and the third switch communicate with the energy storage device, and
wherein the second switch and the fourth switch communicate with a reference potential.

9. The system of claim 8, wherein the current control module controls the first switch and the fourth switch to a conducting state and the second and fourth switch to a non-conducting state during the first period, and wherein the current control module controls the first switch and the fourth switch to a non-conducting state and the second and fourth switch to a conducting state during a second period after the first period.

10. The system of claim 8, wherein the current control module couples the first terminal to the energy storage device and the second terminal to the reference potential during the first period, and wherein the current control module controls couples the first terminal to reference potential and the second terminal to the energy storage device during a second period after the first period.

11. The system of claim 8 further comprising:
a gain and level shifting module that communicates with the first terminal and the second terminal and that generates a raw bemf signal;
a sample and hold circuit that samples the raw bemf signal to generate a sampled bemf signal; and
a converter module that converts the sampled bemf signal into a speed signal.

12. The system of claim 1 further comprising:
a time constant adjustment module that adjusts a sampling interval of the current control module based on a time constant,
wherein the time constant is based on an inductance and resistance of the voice coil motor.

13. The system of claim 1 further comprising:
an analog to digital converter module that converts the bemf signal into a digital signal;
a decoder module that converts the digital signal into a speed signal; and
a pulse width generator module that generates a pulse width modulated control signal for the voice coil motor based on the speed signal.

14. The system of claim 13 further comprising a time constant adjustment module that communicates with the pulse width generator module and that adjusts the pulse width modulated control signal.

15. The system of claim 1, wherein the current control module discharges the current during a second period that is shorter than the first period.

16. The system of claim 1, wherein the first rotation direction is maintained during discharging of the current.

* * * * *